June 21, 1960
F. L. DAVIS
2,941,257
METHOD OF PRODUCING RUBBER GLOVES
Filed Aug. 17, 1956
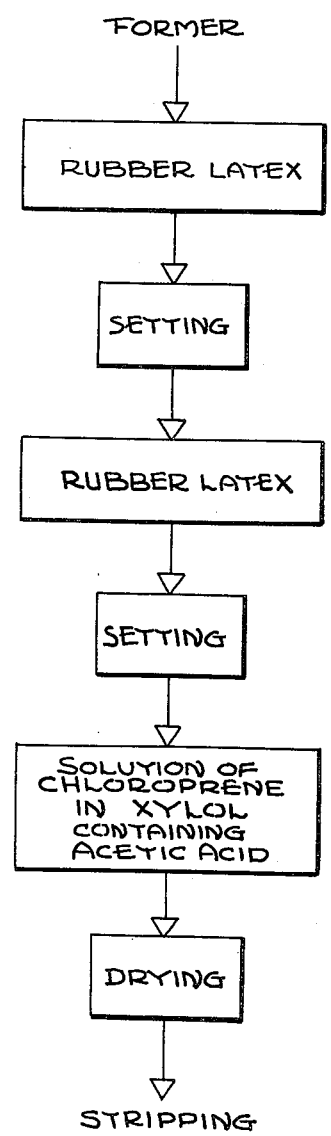
INVENTOR.
FREDERICK LEWIS DAVIS
BY
Stevens, Davis, Miller & Mosher
ATTORNEYS

United States Patent Office 2,941,257
Patented June 21, 1960

2,941,257

METHOD OF PRODUCING RUBBER GLOVES

Frederick Lewis Davis, Wormley, England, assignor to London Rubber Company Limited, Chingford, London, England Filed Aug. 17, 1956, Ser. No. 604,605

2 Claims. (Cl. 18—58.5)

This invention relates to rubber gloves, and has for its object to produce a glove formed mainly of natural rubber but having at least a part of its external surface covered with chloroprene or other synthetic rubber which is more resistant than natural rubber to the action of oils and detergents.

In the manufacture of gloves made wholly of natural rubber, it is known to form the main body of the glove by dipping a former into a dispersion of rubber latex, and to form a rough surface on the glove either by dipping the coated former, after a short setting period, into a mixture of a rubber solvent and an acid, or by re-dipping the former in a dispersion of rubber latex for a second time after the first coating has set and then dipping it in the mixture of rubber solvent and acid. Both of these processes produce irregular ripples on the surface of the glove.

The process is illustrated by the flow diagram shown on the attached drawing.

According to the present invention the gloves, instead of being dipped in a mixture of a rubber solvent and an acid are dipped into a bath containing a solution of chloroprene or other synthetic rubber in a common solvent for such synthetic rubber and natural rubber, the solution being mixed with an acid.

It is found that the rubber latex is roughened in the same manner as in the known process, and, in addition a coating of the synthetic rubber is applied over the whole roughened surface. It is known that the mere deposition of synthetic rubbers such as chloroprene on a film of natural rubbers provides very little adhesion between the materials and the synthetic rubber readily peels off. With the process of the present invention, however, there is some degree of mixing of the natural and synthetic rubbers which give a very good bond, and the synthetic rubber has no tendency to peel off.

The synthetic rubber used is preferably chloroprene, the chloroprene being dissolved in xylol, which is also a solvent for natural rubber, and the solution is mixed with glacial acetic acid.

The chloroprene may be replaced by other synthetic rubbers which are soluble in hydrocarbon solvents.

The gloves may be roughened and coated with synthetic rubber over the whole, or only a part, of their surface, the wrist portion, for example, being left uncoated.

After the first dipping into the dispersion of rubber latex to form an initial coating on the formers, they may be dipped a second time into a dispersion of rubber latex to form a second coating before being dipped into the mixture of synthetic rubber solution and acid. If only a part of the surface of the gloves is to be roughened and coated, only that part of their surfaces may be immersed in the dispersion at the second dip.

I claim:

1. The method of manufacturing rubber gloves which comprises the steps of dipping formers into a dispersion of rubber latex, and after a short setting period, dipping the coated formers into a bath containing a solution of synthetic rubber in a common solvent for such synthetic rubber and natural rubber, the solution being mixed with an acid.

2. The method according to claim 1, wherein the solution consists of chloroprene dissolved in xylol, the said solution being mixed with glacial acetic acid.

References Cited in the file of this patent

UNITED STATES PATENTS

| | | |
|---|---|---|
| 723,301 | Pfeiffer | Mar. 24, 1903 |
| 919,406 | Warren | Apr. 27, 1909 |
| 1,886,351 | Murphy et al. | Nov. 1, 1932 |
| 1,959,021 | Dales | May 15, 1934 |
| 1,983,963 | Belton et al. | Dec. 11, 1934 |
| 2,308,724 | Stamberger | Jan. 19, 1943 |
| 2,326,160 | Neiley et al. | Aug. 10, 1943 |
| 2,434,035 | DeLaney et al. | Jan. 6, 1948 |